US011712658B2

(12) United States Patent
Hong et al.

(10) Patent No.: US 11,712,658 B2
(45) Date of Patent: Aug. 1, 2023

(54) ENVIRONMENTAL EQUIPMENT AND POWER GENERATION SYSTEM USING SAME

(71) Applicant: GEESCO CO., LTD., Yongin (KR)

(72) Inventors: Sung Ho Hong, Seoul (KR); Dae Woo Kim, Incheon (KR)

(73) Assignee: GEESCO CO., LTD., Yongin (KR)

( * ) Notice: Subject to any disclaimer, the term of this patent is extended or adjusted under 35 U.S.C. 154(b) by 0 days.

(21) Appl. No.: 17/607,260

(22) PCT Filed: Feb. 18, 2020

(86) PCT No.: PCT/KR2020/002288
§ 371 (c)(1),
(2) Date: Oct. 28, 2021

(87) PCT Pub. No.: WO2020/226272
PCT Pub. Date: Nov. 12, 2020

(65) Prior Publication Data
US 2022/0234003 A1 Jul. 28, 2022

(30) Foreign Application Priority Data
May 9, 2019 (KR) .......................... 10-2019-0054542

(51) Int. Cl.
*B01D 53/75* (2006.01)
*B01D 53/86* (2006.01)
*B01D 53/90* (2006.01)
*B01D 53/96* (2006.01)

(52) U.S. Cl.
CPC ............ *B01D 53/96* (2013.01); *B01D 53/75* (2013.01); *B01D 53/8631* (2013.01); *B01D 53/90* (2013.01); *B01D 2257/404* (2013.01); *B01D 2258/0283* (2013.01)

(58) Field of Classification Search
CPC .... B01D 53/96; B01D 53/75; B01D 53/8631; B01D 53/90; B01D 2257/404; B01D 2258/0283; B01D 53/56; B01D 53/565; F28D 2021/0024
See application file for complete search history.

(56) References Cited

U.S. PATENT DOCUMENTS

2006/0008394 A1   1/2006   Muramoto et al.
2019/0099714 A1   4/2019   Miyachi et al.

FOREIGN PATENT DOCUMENTS

| CA | 2 672 580 A1 * | 7/2008 | ............ B01D 53/64 |
|---|---|---|---|
| EP | 0 148 741 A1 | 7/1985 | |
| EP | 1 780 466 A1 | 5/2007 | |
| KR | 20080090359 A | 10/2008 | |
| KR | 101566505 B1 | 11/2015 | |
| KR | 20170142377 A | 12/2017 | |
| KR | 20180115762 A | 10/2018 | |
| WO | 2018047377 A1 | 3/2018 | |

OTHER PUBLICATIONS

The Extended European Search Report for European Patent Application No. 20802359.8, dated May 10, 2023.

* cited by examiner

Primary Examiner — Timothy C Vanoy

(57) ABSTRACT

The present invention provides environmental equipment which is able to remarkably reduce operating costs and a power generation system comprising same, comprising: a boiler; a power generation unit for generating electricity by steam generated from the boiler; first denitrifying equipment to which exhaust gas is delivered from the boiler and which sprays a reducing agent into the exhaust gas to denitrify the exhaust gas; a low-low temperature electrostatic precipitator for collecting dust of the exhaust gas provided from the first denitrifying equipment; second denitrifying equipment which sprays a reducing agent into the exhaust gas provided from the low-low temperature electrostatic precipitator to secondarily denitrify the exhaust gas and allows the exhaust gas to be provided towards a smokestack.

17 Claims, 3 Drawing Sheets

ENVIRONMENTAL EQUIPMENT AND POWER GENERATION SYSTEM USING SAME

TECHNICAL FIELD

The disclosure relates to environmental equipment and a power generation system including the same, and more particularly to environmental equipment for reducing discharge of pollutants and a power generation system including the same.

BACKGROUND ART

Numerous thermoelectric power plants generally operate based on coal or petroleum. In particular, with recently tightened regulations on environmental pollution, environmental equipment capable of reducing discharge of pollutants has been increasingly researched, developed and spread.

The related art of such environmental equipment has already been disclosed in Korean Patent Publication No. 2017-0142377 (titled "POLLUTANT REMOVAL APPARATUS AND COMBINED CYCLE POWER GENERATION SYSTEM" and published on Dec. 28, 2017). This related art is characterized in the pollutant removal apparatus that reduces pollutants generated from the thermoelectric power plants.

However, acceptable pollutant-discharge standards are tightened, and thus high-efficiency technology of using a denitrifying catalyst is required to reduce nitrogen oxide, i.e., a precursor of fine dust, which has come up as an environmental issue, into a few PPM levels. Therefore, the conventional environmental equipment includes a denitrifier based on selective catalytic reduction (SCR), which is placed after a flue gas desulfurizer (FGD). The denitrifier based on the SCR needs to use a burner for heating exhaust gas in order to raise the temperature of the exhaust gas. Therefore, the conventional environmental equipment has a problem in that operating costs are excessively increased.

DISCLOSURE

Technical Problem

An aspect of the disclosure is to provide environmental equipment, of which operating costs are significantly reduced, and a power generation system including the same.

Technical Solution

To achieve the aspect of the disclosure, there is provided a power generation system including: a boiler; an electric generator which produces electricity based on steam generated in the boiler; a first denitrifier which receives exhaust gas from the boiler and denitrifies the exhaust gas by spraying a reductant to the exhaust gas; a low low-temperature electric precipitator which collects dust from the exhaust gas provided from the first denitrifier; a second denitrifier which secondarily denitrifies the exhaust gas by spraying the reductant to the exhaust gas provided from the low low-temperature electric precipitator and provides the exhaust gas toward a chimney; a first heat exchanger which is provided between the first denitrifier and the low low-temperature electric precipitator and cools the exhaust gas provided to the low low-temperature electric precipitator; and a second heat exchanger which is connected to the first heat exchanger between the low low-temperature electric precipitator and the second denitrifier and heats the exhaust gas provided to the second denitrifier.

The second denitrifier may secondarily denitrify the exhaust gas based on a low temperature selective catalytic reduction (SCR).

The first heat exchanger may cool the exhaust gas, to be provided to the low low-temperature electric precipitator, to have a temperature of 80~100 degrees, and the second heat exchanger may heat the exhaust gas, to be provided to the second denitrifier, to have a temperature of 150~200 degrees.

The power generation system may further include: a third heat exchanger which is provided between the second denitrifier and the chimney and cools the exhaust gas to be provided to the chimney; and a fourth heat exchanger which is connected to the third heat exchanger and heats air to be provided to the boiler and used for combustion.

The power generation system may further include a catalyst regenerator which is connected to at least one of the first denitrifier and the second denitrifier and supplies a catalyst regeneration material toward a catalyst in the denitrifier.

The catalyst regenerator may spray dry ice toward the catalyst.

The catalyst regenerator may alternately spray dry ice and hot steam toward the catalyst. p The catalyst regenerator may include: a sprayer which is provided outside the denitrifier and supplies the catalyst regeneration material from the outside, and a spraying nozzle which is extended from the sprayer to an inside of the denitrifier and moves up and down inside the denitrifier by a motive power source to spray the catalyst regeneration material toward the catalyst.

The catalyst regenerator may spray the catalyst regeneration material to the catalyst when the catalyst is poisoned.

Meanwhile, environmental equipment connected to a boiler of a power generation system according to the disclosure may include: an electric generator which produces electricity based on steam generated in the boiler; a first denitrifier which receives exhaust gas from the boiler and denitrifies the exhaust gas by spraying a reductant to the exhaust gas; a low low-temperature electric precipitator which collects dust from the exhaust gas provided from the first denitrifier; a second denitrifier which secondarily denitrifies the exhaust gas by spraying the reductant to the exhaust gas provided from the low low-temperature electric precipitator and provides the exhaust gas toward a chimney; a first heat exchanger which is provided between the first denitrifier and the low low-temperature electric precipitator and cools the exhaust gas provided to the low low-temperature electric precipitator; and a second heat exchanger which is connected to the first heat exchanger between the low low-temperature electric precipitator and the second denitrifier and heats the exhaust gas provided to the second denitrifier.

The second denitrifier may secondarily denitrify the exhaust gas based on a low temperature SCR.

The first heat exchanger may cool the exhaust gas, to be provided to the low low-temperature electric precipitator, to have a temperature of 80~100 degrees, and the second heat exchanger may heat the exhaust gas, to be provided to the second denitrifier, to have a temperature of 150~200 degrees.

The power generation system may further include: a third heat exchanger which is provided between the second denitrifier and the chimney and cools the exhaust gas to be provided to the chimney; and a fourth heat exchanger which is connected to the third heat exchanger and heats air to be provided to the boiler and used for combustion.

The power generation system may further include a catalyst regenerator which is connected to at least one of the first denitrifier and the second denitrifier and supplies a catalyst regeneration material toward a catalyst in the denitrifier.

The catalyst regenerator may spray dry ice toward the catalyst.

The catalyst regenerator may alternately spray dry ice and hot steam toward the catalyst.

The catalyst regenerator may include: a sprayer which is provided outside the denitrifier and supplies the catalyst regeneration material from the outside, and a spraying nozzle which is extended from the sprayer to an inside of the denitrifier and moves up and down inside the denitrifier by a motive power source to spray the catalyst regeneration material toward the catalyst.

The catalyst regenerator may spray the catalyst regeneration material to the catalyst when the catalyst is poisoned.

Meanwhile, a power generation system according to the disclosure includes: a boiler; an electric generator which produces electricity based on steam generated in the boiler; a low low-temperature electric precipitator which receives exhaust gas from the boiler and collects dust from the exhaust gas; a denitrifier which denitrifies the exhaust gas by spraying the reductant to the exhaust gas provided from the low low-temperature electric precipitator and provides the exhaust gas toward a chimney; a first heat exchanger which is provided between the electric generator and the low low-temperature electric precipitator and cools the exhaust gas provided to the low low-temperature electric precipitator; and a second heat exchanger which is connected to the first heat exchanger between the low low-temperature electric precipitator and the denitrifier and heats the exhaust gas provided to the denitrifier.

Meanwhile, environmental equipment connected to a boiler of a power generation system according to the disclosure includes: an electric generator which produces electricity based on steam generated in the boiler; a low low-temperature electric precipitator which receives exhaust gas from the boiler and collects dust from the exhaust gas; a denitrifier which denitrifies the exhaust gas by spraying the reductant to the exhaust gas provided from the low low-temperature electric precipitator and provides the exhaust gas toward a chimney; a first heat exchanger which is provided between the electric generator and the low low-temperature electric precipitator and cools the exhaust gas provided to the low low-temperature electric precipitator; and a second heat exchanger which is connected to the first heat exchanger between the low low-temperature electric precipitator and the denitrifier and heats the exhaust gas provided to the denitrifier.

Advantageous Effects

Environmental equipment according to the disclosure and a power generation system including the same, in which exhaust gas is heated based on waste heat of the exhaust gas without a burner, have effects on reducing operating costs and facilitating easy installation and operation of the system.

The technical effects of the disclosure are not limited to the foregoing effects, and other technical effects will become apparent to those skilled in the art through the following descriptions.

MODE FOR CARRYING OUT DISCLOSURE

Below, embodiments of the disclosure will be described with reference to the accompanying drawings. However, the embodiments are not limited to embodiments set forth herein, but may be variously given to complete the disclosure and help a person having ordinary knowledge in the art to fully understand the scope of the disclosure. The shapes, etc. of elements in the accompanying drawings may be exaggerated for clearer description, and like numerals refer to like elements throughout the accompanying drawings.

Figure 1:
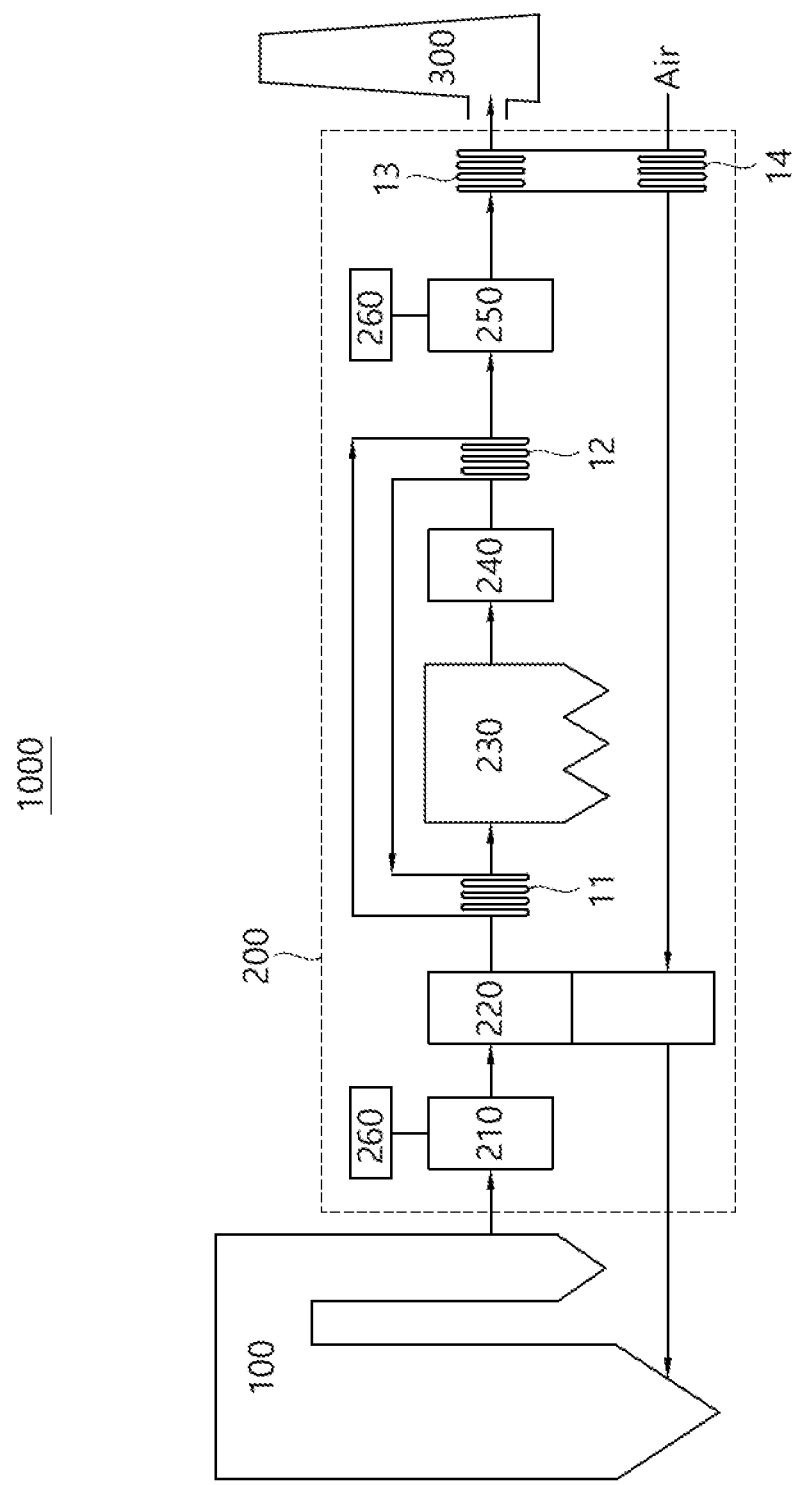
FIG. 1 is a conceptual view schematically illustrating a power generation system according to an embodiment of the disclosure.
Figure 2:
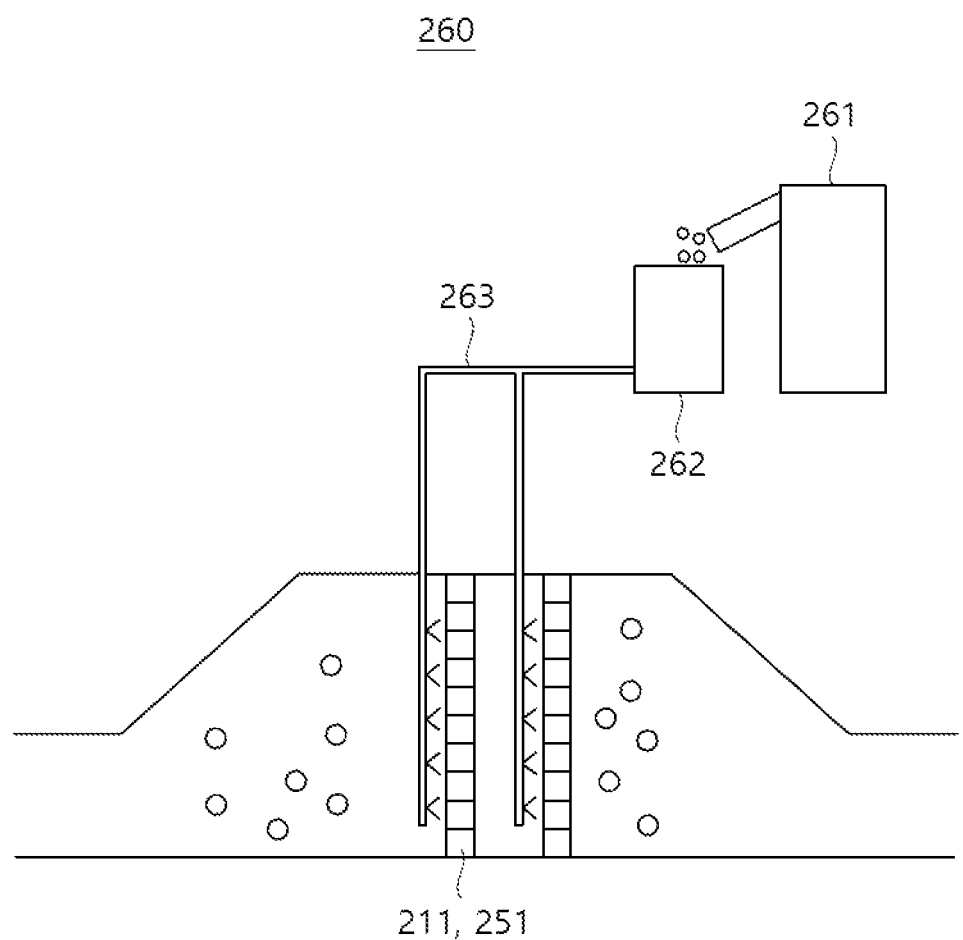
FIG. 2 is a conceptual view illustrating automatic catalyst-regeneration equipment in the power generation system according to an embodiment of the disclosure.

FIG. 1 is a conceptual view schematically illustrating a power generation system according to an embodiment of the disclosure, and FIG. 2 is a conceptual view illustrating automatic catalyst-regeneration equipment in the power generation system according to an embodiment of the disclosure.

As shown in FIGS. 1 and 2, a power generation system 1000 according to an embodiment of the disclosure includes a boiler 100, environmental equipment 200, and a chimney 300.

First, the boiler 100 includes a combustion space in which a burner is installed. In the boiler 100, fuel is supplied to the burner, and air flows into the combustion space. Thus, the boiler 100 generates steam with thermal energy in the combustion space. In this case, the fuel supplied to the boiler 100 may include fossil fuel such as pulverized coal or heavy oil.

For example, when pulverized coal is used as fossil fuel, the burner is provided as a pulverized-coal burner to spray air and pulverized coal into the combustion space. In this case, the pulverized-coal burner may include a low NOx burner to which a low NOx (nitrogen oxide) combustion process is applied. However, the low NOx burner is merely to describe an embodiment of the disclosure, and various kinds of burners may be used. Further, power generation equipment (not shown) is connected to the boiler and produces electricity based on steam provided by the boiler 100.

Meanwhile, the environmental equipment 200 may include a first denitrifier 210, a first rotary air-preheater 220, an electric precipitator 230, a desulfurizer 240, a second denitrifier 250, and a catalyst regenerator 260. In this case, the environmental equipment 200 is connected to the boiler 100 and forms a course to discharge exhaust gas, from which pollutants are removed, to the atmosphere through the chimney 300.

First, the first denitrifier 210 is placed between the boiler 100 and the first rotary air-preheater 220 and receives exhaust gas from the boiler 100. In this case, the first denitrifier 210 may receive the exhaust gas which is primarily denitrified by a selective non-catalytic reduction (SNCR) device or NOx burner installed in the boiler 100. Thus, the first denitrifier 210 secondarily denitrifies the exhaust gas received from the boiler 100.

Here, the first denitrifier 210 may include selective catalytic reduction (SCR) device. Thus, the first denitrifier 210 sprays ammonia, urea or the like reductant to the exhaust gas, thereby converting nitrogen oxide into nonpolluting water and nitrogen on the catalyst.

Meanwhile, the first rotary air-preheater (or gas air heater, GAH) is placed between the first denitrifier 210 and the electric precipitator 230. Thus, the first rotary air-preheater 220 recovers waste heat from the exhaust gas provided by the denitrifier. Further, the first rotary air-preheater 220 previously heats air flowing into the combustion space, thereby improving a combustion efficiency of the boiler 100. In other words, the first rotary air-preheater 220 heats air supplied into the boiler 100 and used for combustion with remaining heat previously used for the combustion.

Further, the electric precipitator 230 is provided as a low low-temperature electric precipitator between the first rotary air-preheater 220 and the desulfurizer 240 and collects dust from the exhaust gas provided by the first rotary air-preheater 220. Here, the electric precipitator 230 may be provided as a dust collector based on electrostatic separation. Thus, dust in the exhaust gas is charged by a metal wire of a cathode, and the charged dust is adhered to an anode shaped like a plate or tube.

The electric precipitator 230 is suitable for large-scale exhaust gas treatment and may additionally include a bag filter to improve a dust-collection efficiency by a hybrid manner. However, this is merely for describing an embodiment of the disclosure, and does not limit the kinds of dust collectors.

Meanwhile, the desulfurizer 240 is provided between the electric precipitator 230 and the second denitrifier 250 and desulfurizes the exhaust gas provided by the electric precipitator 230. Here, the desulfurizer 240 may internally include a cyclone for gas/liquid contact enhancement to improve a desulfurization efficiency. Further, the desulfurizer 240 may be enlarged as compared with a conventional one and additionally include a plurality of gypsum sludge spraying nozzles or the like to keep a desulfurization efficiency of 98% or higher. Further, the desulfurizer 240 may include a mist eliminator in an inside upper portion thereof to prevent gypsum slurry from spilling out. Thus, sulfur dioxide of the exhaust gas is neutralized by reaction with limestone in the desulfurizer 240 and changed into gypsum. In this case, the gypsum may be recycled for industrial use.

Meanwhile, the second denitrifier 250 is provided between the desulfurizer 240 and the chimney 300 and receives the exhaust gas from the desulfurizer 240. In this case, the second denitrifier 250 may include a low-temperature SCR device. Thus, the second denitrifier 250 denitrifies the exhaust gas provided by the desulfurizer 240 so that the denitrified exhaust gas can be discharged to the atmosphere through the chimney 300.

Meanwhile, a first heat exchanger 11 is provided between the first rotary air-preheater 220 and the electric precipitator 230. The first heat exchanger 11 is connected to a second heat exchanger 12 provided between the desulfurizer 240 and the second denitrifier 250. Here, the first heat exchanger 11 and the second heat exchanger 12 may be embodied by tube-type gas gas heaters (GGH). The first heat exchanger 11 cools the exhaust gas, and the second heat exchanger 12 heats the exhaust gas. Further, a third heat exchanger 13 is provided between the second denitrifier 250 and the chimney 300. The third heat exchanger 13 is connected to a fourth heat exchanger 14 provided on a course where air for combustion flows into the first rotary air-preheater 220. Here, the third heat exchanger 13 may be provided as an air preheater that recovers waste heat from the exhaust gas, and thus air to be supplied to the boiler 100 and used for combustion is heated by the fourth heat exchanger 14. The third heat exchanger 13 and the fourth heat exchanger 14 may be embodied by rotary or tubular heat exchangers.

Further, the catalyst regenerator 260 may be connected to at least one of the first denitrifier 210 and the second denitrifier 250. The catalyst regenerator 260 sprays catalyst regeneration materials to catalysts 211 and 251 when the catalysts 211 and 251 are poisoned during the operations of the denitrifiers, thereby preventing the life of the catalysts 211 and 251 from being shortened. In this case, the catalyst regenerator 260 may spray the catalyst regeneration materials including dry ice to the catalysts.

The catalyst regenerator 260 may include a catalyst-regeneration material feeder 261, a sprayer 262, and a spraying nozzle 263. The catalyst-regeneration material feeder 261 may be placed outside the denitrifier and feed the catalyst regeneration material such as dry ice pellet into the sprayer 262. Further, the sprayer 262 sprays the catalyst regeneration material to the catalysts 211 and 251. To this end, the sprayer 262 is connected to the spraying nozzle 263 neighboring on the catalysts 211 and 251 outside the denitrifiers and supplies the catalyst regeneration material to the spraying nozzle 263. Here, the spraying nozzle 263 includes a single spraying hole or a plurality of spraying holes to uniformly spray the catalyst regeneration material to the entire surfaces of the catalysts 211 and 251. The spraying nozzle 263 may be connected to a motor, an actuator or the like motive power source, and move up and down inside the denitrifier.

Thus, the catalyst regenerator 260 has an advantage of preventing the catalyst from being poisoned and shortened in life.

The catalyst regenerator 260 in an embodiment of the disclosure is connected to at least one of the first denitrifier 210 and the second denitrifier 250. However, the catalyst regenerator 260 may be installed only in the second denitrifier 250, and may be installed in both the first denitrifier 210 and the second denitrifier 250 when coal quality is bad.

In an embodiment of the disclosure, the catalyst regenerator 260 sprays dry ice. However, this is merely for describing an embodiment of the disclosure, and the catalyst regenerator may alternately spray dry ice and hot steam.

Further, the environmental equipment 200 according to an embodiment of the disclosure includes the first denitrifier 210 and the second denitrifier 250. However, this is merely for describing an embodiment of the disclosure, and the environmental equipment 200 may include only the second denitrifier 250 without the first denitrifier 210 as necessary.

Below, operations of the environmental equipment according to an embodiment of the disclosure will be described in detail. Here, repetitive descriptions to the foregoing elements will be avoided, and like numerals refer to like elements.

Figure 3:
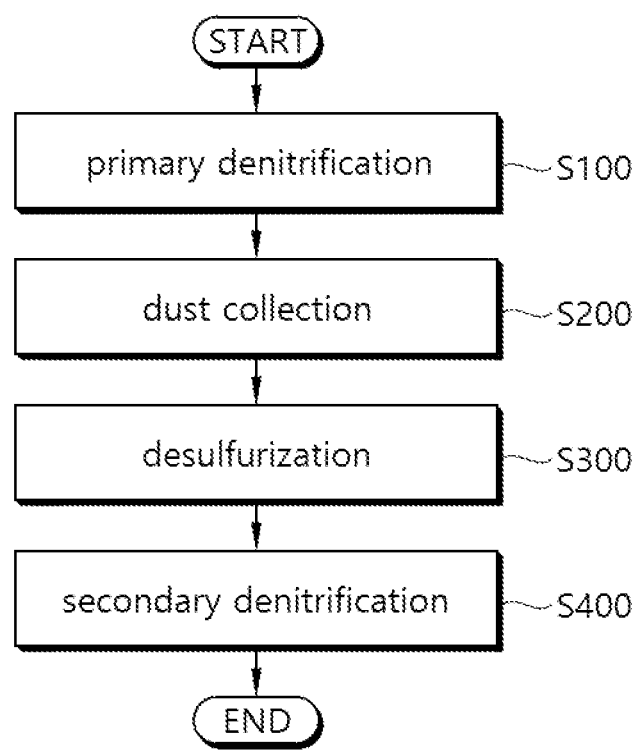
FIG. 3 is a flowchart showing operations of environmental equipment according to an embodiment of the disclosure.

FIG. 3 is a flowchart showing operations of environmental equipment according to an embodiment of the disclosure.

As shown in FIG. 3, the environmental equipment 200 according to an embodiment of the disclosure removes pollutants from exhaust gas provided by the boiler 100 and discharges the exhaust gas to the atmosphere through the chimney 300.

First, the exhaust gas discharged from the boiler 100 is primarily denitrified in the first denitrifier 210 (S100). In this case, the first denitrifier 210 sprays a reductant to the exhaust gas so that nitrogen oxide can be converted into water and nitrogen.

Further, the exhaust gas discharged from the first denitrifier 210 is provided to the first rotary air-preheater 220. In this case, the exhaust gas provided to the first rotary air-preheater 220 has a temperature of about 360 degrees. Here, the first rotary air-preheater 220 recovers waste heat from the exhaust gas and heats air, which will be provided to the boiler 100 and used for combustion, with the waste heat.

Then, the exhaust gas is supplied from the first rotary air-preheater 220 to the electric precipitator 230 via the first heat exchanger 11. In this case, the exhaust gas having a temperature of about 180~250 degrees is provided to the first heat exchanger 11, and the first heat exchanger 11 recovers heat from the exhaust gas so that the exhaust gas having a temperature of about 90 degrees, for example, 80~100 degrees can be provided to the electric precipitator 230.

Then, the electric precipitator 230 collects dust from the exhaust gas (S200). The exhaust gas, from which dust has been removed, is provided to the desulfurizer 240. In this case, the exhaust gas provided to the desulfurizer 240 may be maintained at a temperature of about 90.

Further, the desulfurizer 240 desulfurizes the exhaust gas (S300). Thus, sulfur dioxide of the exhaust gas is neutralized by reaction with limestone and changed into gypsum, and the desulfurizer 240 supplies the desulfurized exhaust gas to the second denitrifier 250. In this case, the exhaust gas passed through the desulfurizer 240 may have a temperature of about 50 degrees.

Meanwhile, the second heat exchanger 12 placed between the desulfurizer 240 and the second denitrifier 250 heats the exhaust gas provided by the desulfurizer 240 so that the exhaust gas having a temperature of about 150~200 degrees can be provided to the second denitrifier 250. Here, the second heat exchanger 12 does not need a burner because the waste heat of the exhaust gas is recycled to heat the exhaust gas. Thus, the environmental equipment 200 excludes or does not employ the burner, thereby reducing fuel costs by more than 10 billion won per year in the case of a 500 MW-class coal-fired power station.

Meanwhile, the second denitrifier 250 secondarily denitrifies the exhaust gas (S400). Here, the second denitrifier 250 secondarily denitrifies the exhaust gas based on low-temperature SCR, so that the secondarily denitrified exhaust gas can be provided toward the chimney 300. Here, the exhaust gas may have a temperature of about 150~200 degrees.

Meanwhile, the third heat exchanger 13 recovers waste heat from the exhaust gas provided toward the chimney, and thus the exhaust gas having a temperature of about 60~85 degrees is discharged through the chimney 300. In this case, the fourth heat exchanger 14 additionally raises the temperature of air, which will be provided to the first rotary air-preheater 220 and used for combustion, by 25 degrees or higher, based on the waste heat recovered in the third heat exchanger 13. Thus, the environmental equipment 200 improves the efficiency of the boiler by about 1% or more, and has an effect on reducing costs by 3.3 billion won per year in the case of the 500 MW-class coal-fired power station.

Accordingly, the environmental equipment according to the disclosure and the power generation system including the same have effect on reducing operating costs and facilitating easy installation and operation of the system because the exhaust gas is heated based on the waste heat of the exhaust gas without the burner.

The embodiments of the disclosure described above and illustrated in the accompanying drawings should not be construed as limiting the technical idea of the disclosure. The scope of the disclosure is limited only by matters disclosed in the appended claims, and various improvements and changes can be made by a person having ordinary knowledge in the art without departing from the technical idea of the disclosure. Therefore, such improvements and changes fall within the scope of the disclosure as long as they are apparent to those skilled in the art.

The invention claimed is:

1. A power generation system comprising:
   a boiler;
   an electric generator which produces electricity based on steam generated in the boiler;
   a first denitrifier which receives exhaust gas from the boiler and denitrifies the exhaust gas by spraying a reductant to the exhaust gas;
   a low low-temperature electric precipitator which collects dust from the exhaust gas provided from the first denitrifier;
   a second denitrifier which secondarily denitrifies the exhaust gas by spraying the reductant to the exhaust gas provided from the low low-temperature electric precipitator and provides the exhaust gas toward a chimney;
   a first heat exchanger which is provided between the first denitrifier and the low low-temperature electric precipitator and cools the exhaust gas provided to the low low- temperature electric precipitator; and
   a second heat exchanger which is connected to the first heat exchanger between the low low-temperature electric precipitator and the second denitrifier and heats the exhaust gas provided to the second denitrifier.

2. The power generation system of claim 1, wherein
   the first heat exchanger cools the exhaust gas, to be provided to the low low-temperature electric precipitator, to have a temperature of 80~100° C., and
   the second heat exchanger heats the exhaust gas, to be provided to the second idenitrifier, to have a temperature of 150~200° C.

3. The power generation system of claim 1, further comprising:
   a third heat exchanger which is provided between the second denitrifier and the chimney and cools the exhaust gas to be provided to the chimney; and
   a fourth heat exchanger which is connected to the third heat exchanger and heats air to be provided to the boiler and used for combustion.

4. The power generation system of claim 1, further comprising a catalyst regenerator which is connected to at least one of the first denitrifier and the second denitrifier and supplies a catalyst regeneration material toward a catalyst in the denitrifier.

5. The power generation system of claim 4, wherein the catalyst regenerator sprays dry ice toward the catalyst.

6. The power generation system of claim 4, wherein the catalyst regenerator alternately sprays dry ice and hot steam toward the catalyst.

7. The power generation system of claim 4, wherein the catalyst regenerator comprises:
   a sprayer which is provided outside the denitrifier and supplies the catalyst regeneration material from the outside, and
   a spraying nozzle which is extended from the sprayer to an inside of the denitrifier and moves up and down inside the denitrifier by a motive power source to spray the catalyst regeneration material toward the catalyst.

8. The power generation system of claim 4, wherein the catalyst regenerator sprays the catalyst regeneration material to the catalyst when the catalyst is poisoned.

9. Environmental equipment connected to a boiler of a power generation system, comprising:
- an electric generator which produces electricity based on steam generated in the boiler;
- a first denitrifier which receives exhaust gas from the boiler and denitrifies the exhaust gas by spraying a reductant to the exhaust gas;
- a low low-temperature electric precipitator which collects dust from the exhaust gas provided from the first denitrifier;
- a second denitrifier which secondarily denitrifies the exhaust gas by spraying the reductant to the exhaust gas provided from the low low-temperature electric precipitator and provides the exhaust gas toward a chimney;
- a first heat exchanger which is provided between the first denitrifier and the low low-temperature electric precipitator and cools the exhaust gas provided to the low low- temperature electric precipitator; and
- a second heat exchanger which is connected to the first heat exchanger between the low low-temperature electric precipitator and the second denitrifier and heats the exhaust gas provided to the second denitrifier.

10. The environmental equipment of claim 9, wherein the first heat exchanger cools the exhaust gas, to be provided to the low low-temperature electric precipitator, to have a temperature of 80~100° C., and
the second heat exchanger heats the exhaust gas, to be provided to the second denitrifier, to have a temperature of 150~200° C.

11. The environmental equipment of claim 9, further comprising:
- a third heat exchanger which is provided between the second denitrifier and the chimney and cools the exhaust gas to be provided to the chimney; and
- a fourth heat exchanger which is connected to the third heat exchanger and heats air to be provided to the boiler and used for combustion.

12. The environmental equipment of claim 9, wherein further comprising a catalyst regenerator which is connected to at least one of the first denitrifier and the second denitrifier and supplies a catalyst regeneration material toward a catalyst in the denitrifier.

13. The environmental equipment of claim 12, wherein the catalyst regenerator sprays dry ice toward the catalyst.

14. The environmental equipment of claim 12, wherein the catalyst regenerator alternately sprays dry ice and steam toward the catalyst.

15. The environmental equipment of claim 12, wherein the catalyst regenerator comprises:
- a sprayer which is provided outside the denitrifier and supplies the catalyst regeneration material from the outside, and
- a spraying nozzle which is extended from the sprayer to an inside of the denitrifier and moves up and down inside the denitrifier by a motive power source to spray the catalyst regeneration material toward the catalyst.

16. The environmental equipment of claim 12, wherein the catalyst regenerator sprays the catalyst regeneration material to the catalyst when the catalyst is poisoned.

17. A power generation system comprising:
- a boiler;
- an electric generator which produces electricity based on steam generated in the boiler;
- a low low-temperature electric precipitator which receives exhaust gas from the boiler and collects dust from the exhaust gas;
- a denitrifier which denitrifies the exhaust gas by spraying the reductant to the exhaust gas provided from the low low-temperature electric precipitator and provides the exhaust gas toward a chimney;
- a first heat exchanger which is provided between the electric generator and the low low-temperature electric precipitator and cools the exhaust gas provided to the low low- temperature electric precipitator; and
- a second heat exchanger which is connected to the first heat exchanger between the low low-temperature electric precipitator and the denitrifier and heats the exhaust gas provided to the denitrifier.

* * * * *